(12) United States Patent
Barinberg et al.

(10) Patent No.: US 10,700,628 B2
(45) Date of Patent: Jun. 30, 2020

(54) CURRENT CONTROL OF A PULSE WIDTH MODULATED POWER CONVERTER

(71) Applicant: WAGO Verwaltungsgesellschaft mbH, Minden (DE)

(72) Inventors: Viktor Barinberg, Nuremberg (DE); Dirk Hansen, Minden (DE); Ulrich Heller, Roethenbach a.d. Pegnitz (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 16/089,889

(22) PCT Filed: Feb. 14, 2017

(86) PCT No.: PCT/EP2017/053231
§ 371 (c)(1),
(2) Date: Sep. 28, 2018

(87) PCT Pub. No.: WO2017/167493
PCT Pub. Date: Oct. 5, 2017

(65) Prior Publication Data
US 2019/0115862 A1   Apr. 18, 2019

(30) Foreign Application Priority Data

Mar. 31, 2016 (DE) ........................ 10 2016 205 300

(51) Int. Cl.
*H02P 6/14* (2016.01)
*H02P 27/08* (2006.01)
*H02P 21/22* (2016.01)

(52) U.S. Cl.
CPC .............. *H02P 27/08* (2013.01); *H02P 21/22* (2016.02)

(58) Field of Classification Search
CPC .................................. H02P 21/22; H02P 27/08
See application file for complete search history.

(56) References Cited

U.S. PATENT DOCUMENTS

2015/0097434 A1*  4/2015  Harrison ................. H02J 3/383
                                                              307/43
2015/0306962 A1   10/2015  Ransom

FOREIGN PATENT DOCUMENTS

DE          10038570 A1    12/2001

OTHER PUBLICATIONS

International Search Report and Written Opinion dated May 16, 2017 in International Application No. PCT/EP2017/053231.

(Continued)

*Primary Examiner* — Karen Masih
(74) *Attorney, Agent, or Firm* — Muncy, Geissler, Olds & Lowe, P.C.

(57) ABSTRACT

The present invention relates to a method for the current control of a pulse width modulated power converter for an electric machine, in particular a pulse width modulated inverter connected to the electric machine. The machine and the inverter thereby comprise a plurality of phases, and the current control is carried out by means of a control loop comprising a modulator for the calculation of switching times for a pulse generator for producing a pulse width modulated control voltage for each phase. Furthermore, the present invention relates to a corresponding device for current control of an inverter connected to an electric machine.

16 Claims, 4 Drawing Sheets

(56) References Cited

OTHER PUBLICATIONS

Figure 1:
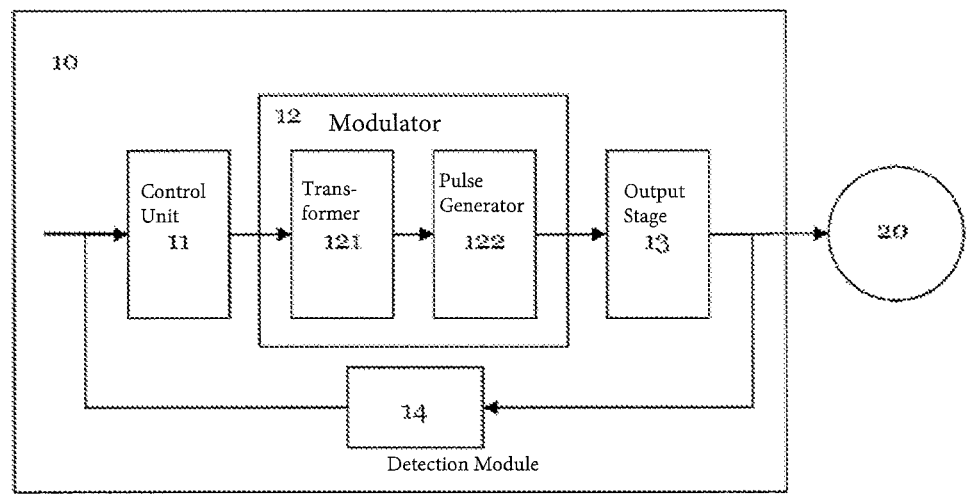

Florian Senicar et al: "Enhanced bandwidth current controller for FPGA based inverter drives—a detailed analysis and implementation", IECON 2012—38th Annual Conference on IEEE Industrial Electronics Society, IEEE, Oct. 25, 2012, pp. 1775-1780, XP032281280.
Eunsoo Jung et al: "FPGA-based motion controller with a high bandwidth current regulartor", Power Electronics Specialists Conference, 2008. PESC 2008. IEEE, IEEE, Piscataway, NJ, USA, Jun. 15, 2008, pp. 3043-3047, XP031300425.

\* cited by examiner

CURRENT CONTROL OF A PULSE WIDTH MODULATED POWER CONVERTER

This application is a 371 National Phase of PCT Application No. PCT/EP2017/053231, filed on Feb. 14, 2017; and this application claims priority of Application No. DE 10 2016 205 300.0 filed in Germany on Mar. 31, 2016, and which is herein incorporated by reference in its entirety.

1. TECHNICAL FIELD

The present invention relates to a method for current control of a pulse width modulated power converter of an electrical machine, in particular a pulse width modulated inverter which is connected to an electrical machine.

2. TECHNICAL BACKGROUND

Modern power converters based on semiconductors are usually controlled by means of pulse width modulation (PWM). A corresponding control unit thereby generates a pulse pattern with modulated width in order to control the conversion of an injected electrical current (DC, AC) into the respective other, or to change characteristic parameters such as the voltage and the frequency. One of the most common applications of power converters is the control of variable speed electric motors, for example permanent magnet synchronous motors. The PWM frequency can be a constant value (for example 20 kHz) or adjustable during operation.

Thus, for example, in a 3-phase motor, by selectively switching each phase u, v, w by means of a PWM control from the DC voltage in the intermediate circuit an AC voltage is generated that drives the motor. The PWM control is provided with a measured current as the actual value (actual current) for controlling the pulse width, such that the PWM control can change the switching times and the pulse pattern of each phase, respectively, and thereby control and readjust, respectively, the amount, the frequency and the phase angle of the applied voltage.

The actual current can thereby be measured at discrete sampling times and from this PWM signals, i.e. the determined switch over and switching times, respectively, of the phases, can be determined. These are applied and used, respectively, output delayed by a sampling interval defined by two successive sampling times.

From DE 100 38 570 A1 a method for controlling the stator current of an electrical machine is known. In this case, currents are sampled at discrete points in time, and converted into a corresponding control output value, which is used with a delay of a PWM time step. Thereby, it is suggested to use a predictive actual current value for controlling the stator current. This allows for a compensation of the delay and to increase the bandwidth of the control loop. However, such a prediction is associated with disadvantages, in particular because of its sensitivity with respect to changes of engine parameters, by what ultimately the accuracy and stability of the control is affected.

It is an object of the present invention to enable an efficient and precise control of a current. In particular, the present invention is based on the object to provide a current control, for example, of an electrical machine connected to an inverter with high temporal dynamics.

These and further objects, which will become apparent from the following description, are achieved by the method according to claim 1 and by the device according to claim 11.

3. SUMMARY OF THE INVENTION

The invention relates to a method for current control of a power converter, which is in particular a pulse width modulated power converter for an electric machine. Furthermore, in particular, the method is suitable for current control of a pulse width modulated inverter for an electrical machine. In general, any pulse width modulated power converter can be controlled by means of this method, which comprises one or more phases and which is nowadays preferably realized by a MOSFET or IGBT. The electric machine can thereby generally be any electro-magnetic energy converter, and can be designed for example as an electric drive, motor, generator, transformer or grid inverter. Preferably, the electric machine also has multiple phases. For example, the method can be used to control a 3-phase machine which is connected to such an inverter. For example, the method is suitable for current control of a permanent magnet synchronous machine. The current control is carried out by a control loop. This control loop comprises means, such as preferably a modulator, for calculating switching times, preferably with a pulse generator, for generating a pulse width modulated voltage or control voltage for each phase. It is thus possible to generate a PWM pattern, wherein in particular it is regulated at which times each phase is switched to a positive or negative potential of the intermediate circuit, whereby the respective phase switches over. The control can, for example, be carried out by microcontrollers, which can comprise an independent unit for generating a pulse width modulated signal with little software effort.

The method for current control comprises a detection of a first actual current value of the machine in a first interval. Preferably, the detection of the actual current value takes place in the context of a time-discrete control at discrete sampling times. Preferably, the actual current is detected and sampled, respectively, at the beginning of the first interval. Further preferably, the detection of the actual current value takes place at the beginning of each interval. The definition of discrete sampling times can be carried out such that the sampling frequency coincides with the PWM frequency or is in a certain relation to it (such as a half or a double PWM frequency).

Preferably, the actual current value is detected at the times within the PWM interval at which switching operations do not take place in any phase, such that the detection of the actual current value can take place as free from interference as possible. The detection is thus preferably carried out at a time at which no phase was switched in a PWM interval. This time can thus be very early in a PWM interval. The first interval, in turn, may be a sampling interval, which is defined by two consecutive sampling times. At a sampling time, an actual current value of the machine can be detected.

Furthermore, the method comprises calculating a predictive first set of switching times for signals for generating the pulse width modulated voltage of each phase in an interval following the first interval. This interval is in the following referred to as the present interval, which may currently be present. The calculation does not have to take place in this present interval, but the resulting set of switching times can apply to the present interval. During the calculation, therefore, the present interval does not have to be up-to-date, but moreover, meanwhile the first interval is preferably the currently running interval. The set of switching times may include discrete points in time for switching the individual phases from positive to negative potential and/or vice versa, preferably during and in the current interval, respectively, or information concerning such a switching of each phase. By means of the first set of switching times, the power converter and the corresponding current control unit, respectively, can switch over each phase, namely at defined times in the present interval. The calculation is preferably carried out during the first interval. The present interval may be the interval immediately following the first interval. The calculation of the predictive first set of switching times is carried out based at least on the detected first actual current value, a predictive actual current value and a current nominal value. The predictive actual current value is determined at least on the basis of the detected first actual current value. The calculation of the predictive first set preferably comprises a comparison of the detected first actual current value with the current nominal value. The current nominal value can describe a nominal value of the current for the first interval or for the present interval which follows the first interval. By such an actual/nominal value comparison, a control deviation is determined, and the first set of switching times is calculated accordingly, which defines switching times of the phases in the present interval. Thus, switching times for the following and present interval, respectively, are preferably predicted in the first interval.

According to the method, the calculated predictive first set of switching times is provided in the present interval. Thereby, the first set of switching times of the pulse width modulated voltage of each phase was calculated prior to this present interval. The predictive first set of switching times is initially considered valid for the present interval, such that preferably the modulator's pulse generator operates based on that first set. However, the first set can be displaced by a different set of switching times, such that, as the case may be, none of the switching times of the first set in the present interval is actually implemented.

The method further comprises a detection of a present actual current value of the machine in the present interval, which is preferably at the beginning of this interval. The detection of the present actual current value can be carried out analogously to the above-described detection of the first actual current value.

The method further comprises a calculation of a second set of switching times for signals to generate the pulse width modulated voltage of each phase in the present interval. The calculation of the second set of switching times is carried out based at least on the detected present actual current value and the current nominal value. The calculation is preferably carried out during the present interval which temporally follows the first interval. Thus, a second set of switching times is calculated which, in contrast to the predictive first set of switching times is calculated directly up to date for the present interval, based on the detected present actual current value, which is valid for the present interval. Like the predictive first set of switching times also the second set of switching times affects the switching times for each phase in the present interval, such that by means of the second set of switching times the power converter and the current control unit, respectively, can switch each phase, in fact at defined times in the present interval. The calculation of the second set preferably comprises a comparison of the detected present actual current value with the current nominal value. The current nominal value can, as described, describe a nominal value of the current for the present interval. By such an actual/nominal value comparison a control deviation is determined, and accordingly the second set of switching times is calculated, which, compared with the forecast and prediction, respectively, which, for example, toke place during the calculation of the predictive first set in the previous and first interval, respectively, defines more accurate switching times of the phases for and in the present interval, respectively.

Further, the method includes a determination whether at a calculation time at which the calculation of the second set of switching times is completed, none of the switching times from the first and second set of switching times is in the past. It is, thus, determined whether one of the switching times is prior to the calculation time and in particular in the computing time. The calculation time does not have to describe the exact time at which the calculation of the second set of switching times is completed. The calculation time at which the calculation is completed may also be after this completion of the calculation. It can thus be determined whether a takeover of the recalculated switching times of the second set is still possible. For this purpose, it can be checked whether 1) none of the phases, based on the first and "predictive" set, respectively, of switching times calculated in the previous and first interval, respectively, has already switched, and 2) none of the recalculated switching times of the second set of switching times is already in the past. This check is carried out for example by a comparison of the edge positions and the switching times, respectively, of the phases with a predetermined computing time (e.g. with a predictive calculation time) or a present time at which the calculation is completed.

When it is determined, at the calculation time in the present interval, that none of the switching times of the first and second sets of switching times are in the past, the second set of switching times are used for signals for generating the pulse width modulated voltage of each phase in the present interval.

Thus, if the above conditions are true, i.e. a takeover of the recalculated switching times of the second set is still possible, a takeover of the second set of switching times can take place, preferably by the pulse generator of the modulator. The switching times used and pulse patterns, respectively, of each phase in the present interval now do not base on the predictive first set of switching times, but on the precisely calculated second set of switching times. Because the second set of switching times was calculated based on the detected actual current value in the present interval, the corresponding control values are very accurate. Since they are used in the same interval, the delay between the actual value acquisition and the controller output is minimized. As a result the current control is very dynamic. The person skilled in the art will understand that if at calculation time one of the phases has already switched, in fact based on the already applicable first set of switching times, or at least a recalculated switching time of the second set already is relative to the calculation time in the past, the second set cannot be used. Rather, in this case, the first predictive set of switching times continues to be used. However, according to the present invention, it is desirable to use the second set of switching times once it has been determined according to the invention that this is possible and does not lead to any inconsistency and disturbance, respectively, of the desired output voltages in the phases.

If it is determined, at the calculation time in the present interval, that at least one of the switching times from the first or second set of switching times is in the past, then the first set of switching times is used (or continued to be used) for signals for generating the pulse width modulated voltage of each phase in the present interval. Thus, if the above conditions do not apply to the application of the second set of switching times, then the first set of switching times already in effect is used, preferably by the pulse generator of the modulator.

Thus, in the present interval, the control of the phase voltages is either based on the predictive first set of switching times, or based on the second set of switching times. The second set of switching times is only used and accepted, respectively, if the above conditions apply. This prevents, for example, that the degree of modulation of one of the three phases of the predictive first set of switching times is determined and the degree of modulation of two other phases from the second set of switching times is taken over. This would lead to an inconsistent three-phase voltage system, which is advantageously avoided by the method according to the invention.

Preferably, during the present interval, further a calculation of a predictive third set of switching times takes place for signals for generating the pulse width modulated voltage of each phase in a future interval following the present interval, which preferably immediately follows the present interval. This calculation of the predictive third set is based on at least the detected present actual current value, a predictive future actual current value and a current nominal value. The predictive future actual current value is determined at least on the basis of the detected present actual current value. The current nominal value can describe a nominal value of the current for the future interval following the present interval. As a first approximation of such a future current nominal value, for example, the current nominal value in the present interval can be taken. This current nominal value is therefore referred in the following as the future current nominal value, but does not have to reflect the actual valid current nominal value of the future interval.

The calculation of the predictive third set of switching times preferably comprises a comparison of the predictive future actual current value with the corresponding future current nominal value. The predictive future actual current value is preferably related to the future interval following the present interval, and thus describes an estimate of an actual current value for the future interval. By comparing the predictive future actual current value with the future current nominal value, it can thus be determined how the control of the pulse width modulated voltage in the future interval has to take place.

Accordingly, the method preferably further comprises providing the predictive third set of switching times in the future interval. This will ensure that for the following future interval switching times for the phases are present, such that an efficient control of the electrical machine is possible. These are used if correspondingly precisely calculated values cannot be used in the future interval because, as described above, a condition for use and take over, respectively, of the exactly calculated values is not fulfilled. The method is thus repeated for the following interval, wherein the provided predictive third set of switching times is now serving and valid as, respectively, a provided first set of switching times for the following interval.

The method of current control thus offers the advantage that the prediction-based control values are only used in a few cases, for example, at a relatively high degree of modulation, if one of the edges comes prior to the calculation time and before the calculation of the new switching times is completed, respectively. The otherwise unavoidable delay in one cycle is thereby considerably reduced and inconsistencies in the voltage output are prevented, respectively.

Preferably, the first and the present interval are each a period or half a period of the pulse width modulated voltage and the carrier frequency of the pulse width modulated voltage, respectively. The control loop is thus characterized by high dynamics, and the bandwidth of the controller, so the controller speed is increased.

Preferably, the determination whether at the calculation time in the present interval, none of the switching times from the first and second set of switching times is in the past, and the determination, respectively, whether to accept the second set of switching times calculated and determined, respectively, in the present interval and, respectively, may be used in the present interval, after and more preferably immediately after calculating the second set of switching times. It is thus determined and checked, respectively, after the second set of switching times has been calculated based on the detected present actual current value in the present interval whether, for example, one of the phases has already switched based on the predictive first set of switching times or, for example, one of the recalculated switching times of the second set is in the past. Thus, it is preferably checked whether the use of the second set of switching times is still possible for all phases in the present interval following the calculation of this set, without causing inconsistencies of the voltage output.

Preferably, the determination is made as to whether at the calculation time in the present interval, none of the switching times from the first set of switching times is in the past, and, respectively, whether up to that calculation time in the present interval one of the phases switches, prior to and/or during the calculation of the second set of switching times. In that case, the computation time and the calculation time, respectively, is preferably a provided predictive calculation time in the present interval based on a predictive computation time. This predictive calculation time can be based on a known average computation time for the calculation of the second set of switching times. Thus, before and/or during calculation of the second set of switching times, it can be determined whether the calculation of the second set of switching times will be or is completed before one of the phases based on, for example, the predictive first set of switching times has switched. This makes it possible to efficiently check whether an accurate, dynamic control in the same interval is possible or would lead to inconsistencies in the voltage output. In particular, preferably the calculation of the second set of switching times itself may depend on the result of this determination. If already prior to the calculation of the second set of switching times it is determined that at least one phase will have switched before the (predictive) calculation time, the calculation of the second set can for example be omitted. Otherwise, after calculating the second set of switching times, it can be checked whether none of the recalculated switching times is in the past. If so, the first "predictive" set of switching times can be overridden by the second set.

Preferably, if it has been determined at the calculation time in the present interval, that none of the switching times from the first and second set of switching times is in the past, the provided first set of switching times will be overwritten in a memory with the second set of switching times. The memory can be a memory of the power converter, in which the sets of switching times can be provided. Due to the fact that in this case no phase has yet switched based on the predictive first set of switching times, the second set may be used in place of the first set without causing inconsistencies in the voltage output.

Preferably, if it has been determined, at the calculation time in the present interval, that at least one of the switching times from the first or second set of switching times is in the past, the second set of switching times will be discarded. This ensures that no inconsistent voltage output can occur, and in an interval, all phases are switched uniformly according to a single set of switching times.

Preferably, the predictive actual current value is generated by adding the detected first actual current value with an actual current value change determined by current prediction. In particular, preferably any known current prediction can be carried out. For example, the method known from DE 100 38 570 A1 can be used for current prediction. Thus, accurate control values can be determined that enable a good control of the machine if a dynamic and precise control based on a corresponding actual current value should not be feasible in the following interval. Likewise, the predictive future actual current value is preferably generated by an analog addition of the detected present actual current value with an actual current value change determined by current prediction.

Preferably, the calculation of the predictive first set of switching times is further based on an older actual current value of the machine. Thus, with the current prediction the history of the determined and, respectively, detected actual current values is used. The older actual current value was recorded in a previous interval. Preferably, multiple older actual current values detected at a plurality of previous intervals may be taken into account for calculating the predictive first set of switching times. For example, to generate the predictive actual current value, an interpolation can be carried out based on the history and the first actual current value detected in the first interval. Thus, an accurate prediction and corresponding determination of the predictive first set of switching times can be carried out.

The invention further relates to a device for current control of a power converter, preferably a pulse width modulated power converter for an electrical machine. The device is particularly suitable for current control of a pulse width modulated inverter for the electrical machine. The inverter can be connected as part of an electric drive to a single- or multi-phase electric machine (for example, a permanent magnet synchronous machine). The converter and the machine have several phases. In doing so, the current control of the power converter and the inverter and the machine, respectively, is carried out by a control loop, preferably, as described above, with a means for calculating switching times for generating a pulse width modulated voltage pattern for each phase. The current control can be provided as part of the device or separately to this. The device comprises a modulator for pulse width modulation of a voltage of each phase. The device further comprises a detection module, which is adapted for detecting an actual current value of the machine.

Furthermore, the device comprises a calculation module which is adapted to calculate, preferably during a first interval, a predictive first set of switching times for signals for generating the pulse width modulated voltage of each phase in a present interval following the first interval, based at least on a first actual current value detected in the first interval, a predictive actual current value and a current nominal value. The calculation module is adapted for determining the predictive actual current value based on at least the detected first actual current value. Preferably, the calculation module is adapted to carry out this calculation in each currently running interval.

Further, the calculation module is configured to calculate, preferably during the present interval, a second set of switching times for signals for generating the pulse width modulated voltage of each phase in the present interval based at least on a present actual current value detected in the present interval and the current nominal value. Preferably, the device comprises a comparison module which is coupled to the calculation module and which is adapted for comparing the present actual current value with a current nominal value, and for comparing the predictive actual current value with a current nominal value.

Furthermore, the device comprises a decider of the modulator, which is adapted to determine whether, up to a calculation time at which the calculation of the second set of switching times in the present interval is completed, none of the switching times from the first and second set of switching times is in the past. The decider can, thus, determine that, relative to the calculation time, none of the edges of the phases generated based on the first and, respectively, "predictive" set of switching times calculated in the previous first interval has already switched, and none of the recalculated switching times of the second set is already in the past. The device further comprises an output module adapted to provide to the modulator, preferably at the beginning of an interval, the first and, respectively, "predictive" set of switching times for signals for generating the pulse width modulated voltage of each phase in the interval. The output module is further configured to provide the second set of switching times for signals for generating the pulse width modulated voltage of each phase in the present interval to the modulator.

Preferably, the device further comprises a prediction module, which is adapted for determining the predictive actual current value.

In this case, the device is preferably configured to carry out the provision of the first set of switching times by means of the output module, if it is determined by the decider that at the calculation time in the present interval at least one of the switching times from the first or second set of switching times is in the past. The device is preferably further configured to carry out the provision of the second set of switching times by means of the output module if it is determined by the decider that at the calculation time in the present interval, none of the switching times from the first and second sets of switching times is in the past, i.e. in particular, none of the phases has already switched based on the first set of switching times calculated in the previous interval and none of the switching times of the second set is already in the past.

Preferably, the calculation module is further configured to calculate, in particular during the present interval, a predictive third set of switching times for signals for generating the pulse width modulated voltage of each phase in a future interval following the present interval, based at least on the detected present actual current value, a predictive future actual current value and a current nominal value which is preferably valid for the future interval. The calculation module is preferably adapted for calculating the predictive future actual current value on the basis of at least the detected present actual current value. For this purpose, the predictive future actual current value can preferably be compared with the (future) current nominal value by means of the comparison module. Such a comparison of the predictive actual current value with the current nominal value by means of the comparison module preferably takes place in each interval for the subsequent interval.

If necessary, the provision of the predictive third set of switching times is carried out by means of the correspondingly adapted output module to the modulator for the following future interval. The provided predictive third set of switching times now serves again as a provided first set of switching times for the following future interval.

Preferably, the calculation module comprises a digital logic, such as a state machine logic, in particular within a field programmable gate array (FPGA). By using FPGA technology, and preferably fast A/D converters, the computation time to calculate the second set of switching times can be significantly reduced such that the second set of switching times is calculated within the present time interval. However, since the required computing time is not insignificantly long, it is advantageously determined by means of the decider whether a use of the second set of switching times in the present interval is still possible without causing inconsistencies of the voltage output.

Preferably, the device further comprises a memory element for storing the calculated predictive first set of switching times. In this case, the decider is preferably adapted to cause the stored first set of switching times to be overwritten with the second set of switching times, if it has been determined that up to the calculation time in the present interval none of the switching times from the first and second set of switching times is in the past, that is, if, for example, it is determined by the decider that none of the phases based on the first set of switching times has already switched and none of the switching times of the second set is in the past.

Preferably, the device is configured to carry out one of the above-described methods for current control of a power converter, and in particular a power converter and inverter, respectively, connected to an electrical machine.

In particular, the device preferably comprises a controller and a control unit, respectively, wherein the modulator is connected to one and, respectively, the output of the control unit, and a 3-phase output stage, in particular a 3-phase inverter, connected to one and, respectively, the output of the modulator. The detection module is connected to the 3-phase output stage, and the detection module is connected with the control unit in order to form a control loop. Preferably, the modulator comprises a pulse generator for generating pulse patterns for a pulse width modulation of a voltage of each phase and, respectively, for generating a pulse width modulated voltage of each phase, a transformer, a memory and the decider. The person skilled in the art will understand that the modulator's transformer can be used to transform an input signal into respective signals for each of the three phases.

Preferably, the detection module is thereby adapted to detect an actual current value of the machine in one and in particular in the first and in the present interval. Preferably, the control unit and the transformer are adapted to calculate the predictive first set of switching times and to calculate the second set of switching times. Preferably, the memory is configured to provide the first set of switching times in the present interval. Preferably, the decider is configured to compare the calculation time with each switching time of the second set of switching times. The decider can thus be configured in particular to compare the calculation time determined by the computation time with each switching time of the first and/or the second set of switching times for generating the pulse width modulated voltages of the phases. Preferably, the decider is further configured to output a control signal to cause the second set of switching times to be applied to the pulse generator for generating and, respectively, generating the pulses and, respectively, the pulse pattern in the present interval if, according to the comparison, the calculation time is prior to each of the switching times in the present interval. Preferably, the decider is further configured to output a control signal to cause the first set of switching times to be applied to the pulse generator for generating the pulses and, respectively, the pulse pattern in the present interval and in particular is not overwritten, if according to the comparison, the calculation time is not prior to each of the switching times in the present interval.

According to the present invention, the switching times for signals for generating the pulse width modulated voltages of each phase in a present interval are calculated twice: at first, in a previous interval, a predictive first set of such switching times is calculated and predicted, respectively. In the present interval, a second set of such switching times is then calculated, taking into account a present up to date actual current value and a current nominal value. If the second set of switching times can be used in the present interval, it can be taken over directly or the predictive first set of switching times stored in a latch/register can be overwritten, such that the second set of switching times is used. Otherwise, the predictive first set of switching times is used. Furthermore, in the current case, as a second, a predictive third set of switching times for the next interval can be calculated and predicted, respectively.

4. BRIEF DESCRIPTION OF THE DRAWINGS

Figure 2:
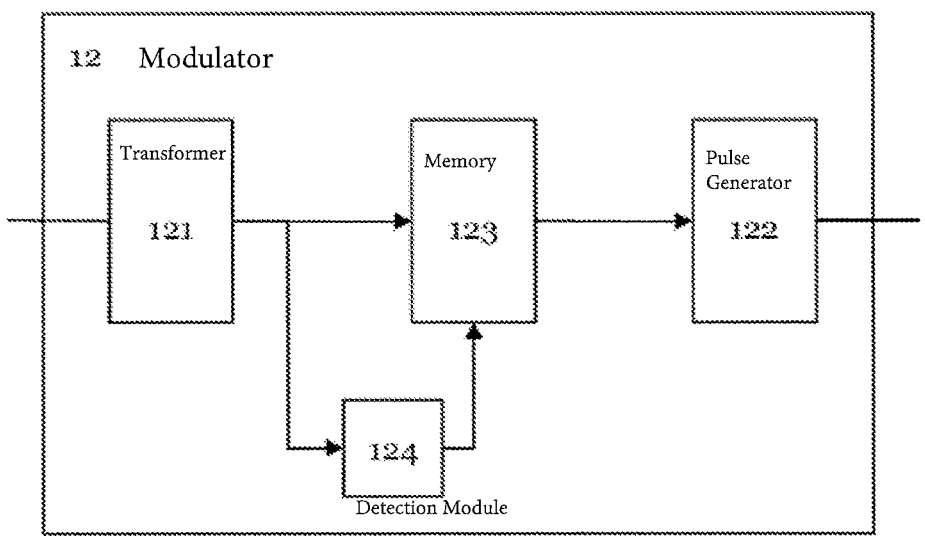
Figure 3:
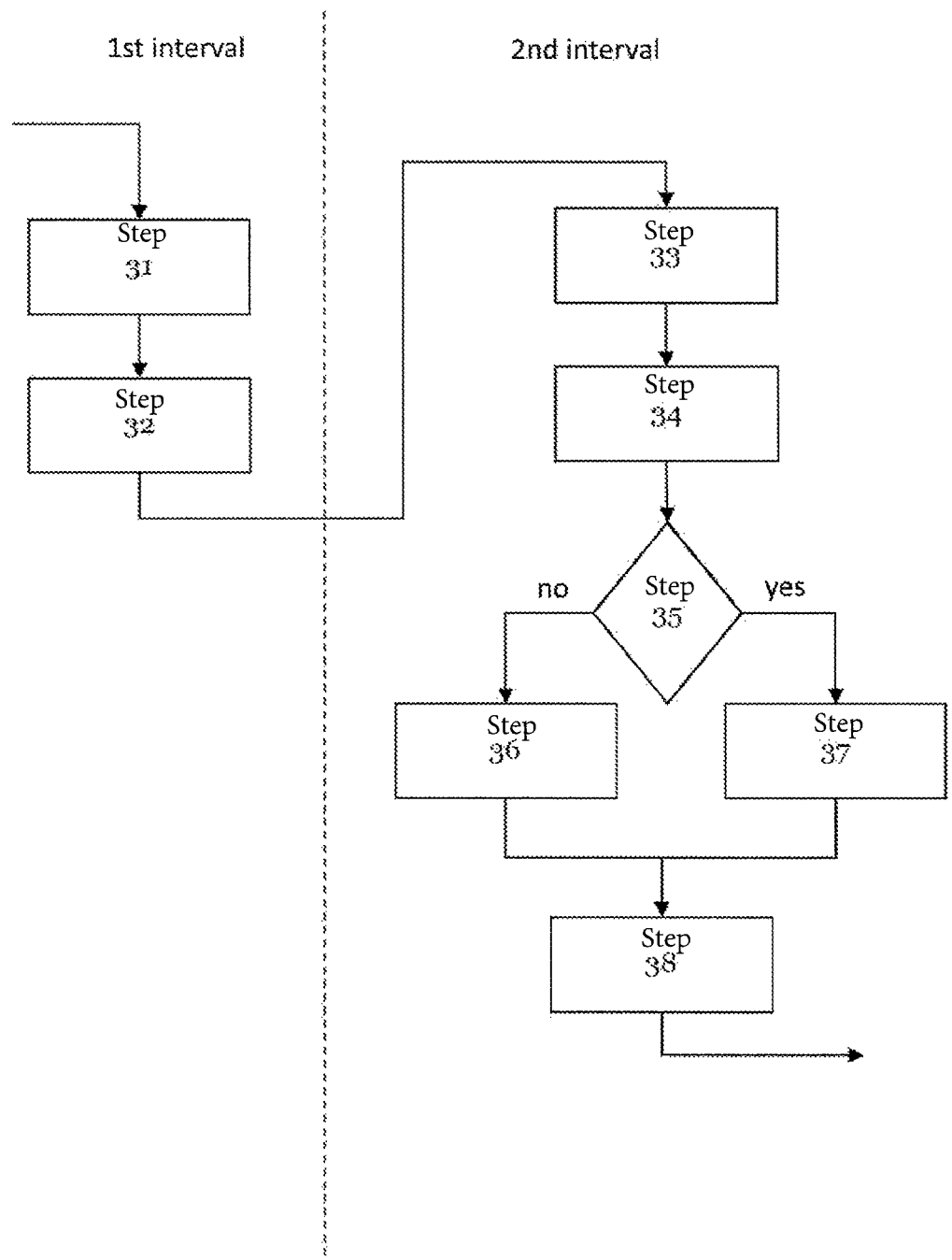
Figure 4:
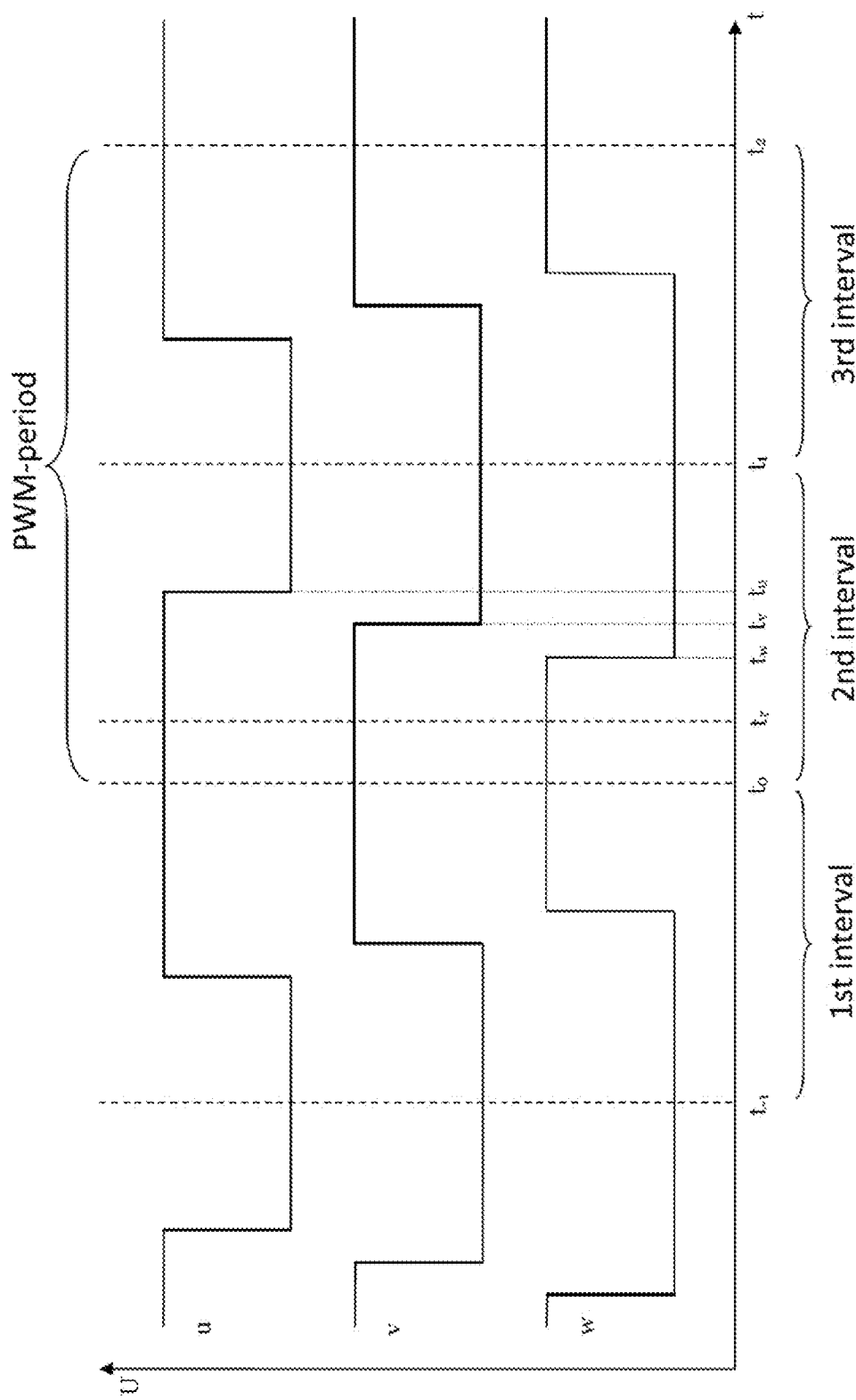
Figure 5:
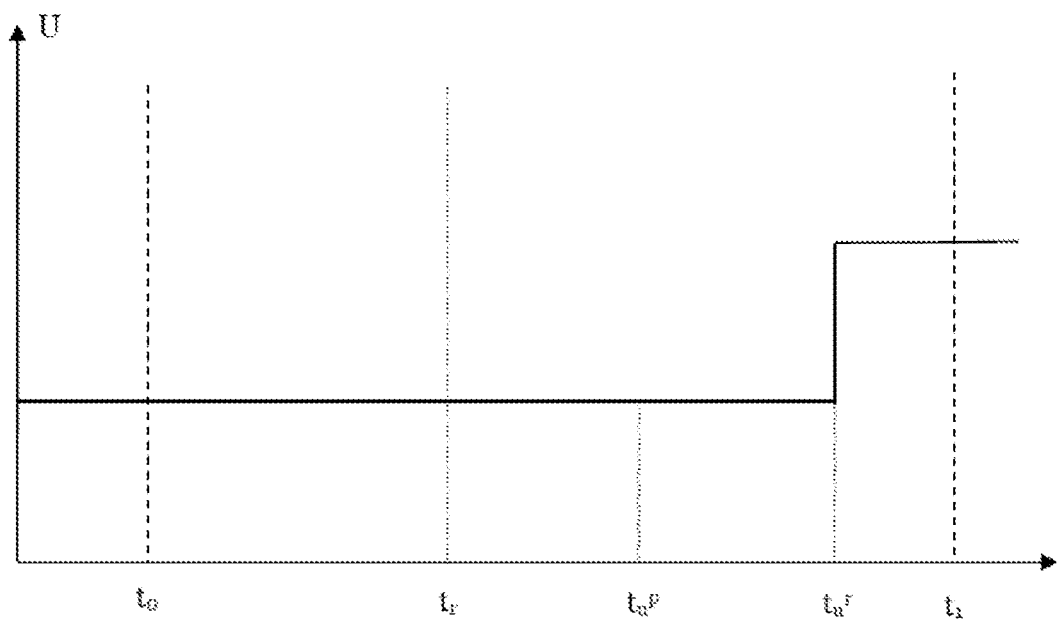
Figure 6:
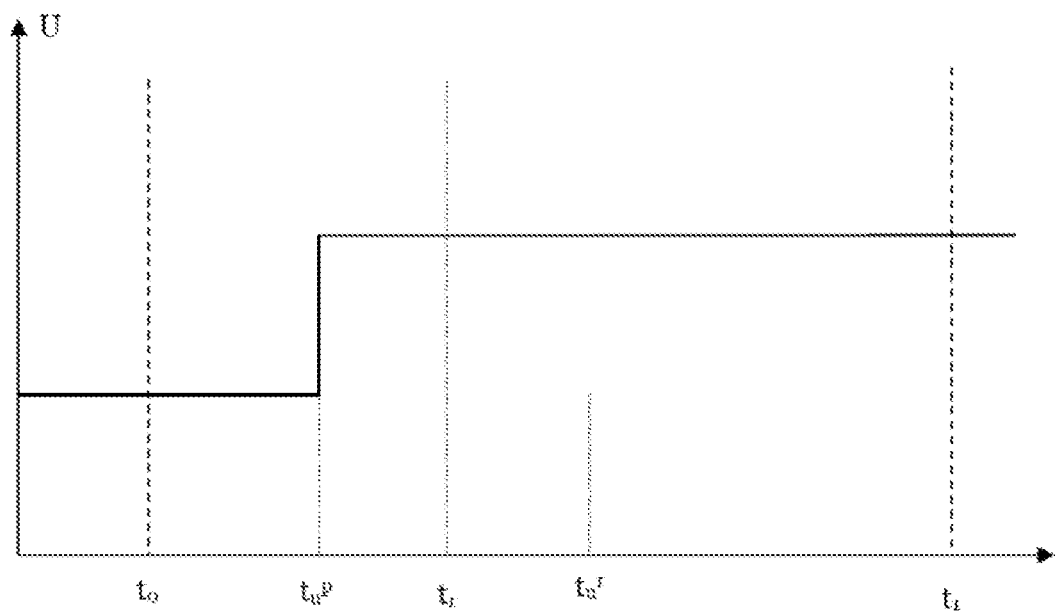

In the following, exemplary embodiments of the present invention will be described in more detail with reference to the accompanying drawings. Thereby, like elements are identified by the same reference numerals. It shows:

FIG. 1 schematically the structure of a current control of an electric drive according to an embodiment;

FIG. 2 schematically the structure of a modulator according to an embodiment;

FIG. 3 schematically the sequence of a method for current control of an electric machine according to a further embodiment;

FIG. 4 schematically the course of signals for controlling three phases of an inverter;

FIG. 5 schematically the course of a signal for controlling a phase of an inverter;

FIG. 6 schematically the course of a signal for controlling a phase of an inverter.

5. DESCRIPTION OF PREFERRED EXEMPLARY EMBODIMENTS

FIG. 1 shows schematically the structure of a current control of an electric drive. This includes an electric motor 20, for example, a permanent magnet synchronous machine, but may also include other electrical machines (such as for example an asynchronous machine or a reluctance machine). The motor 20 is controlled by means of a control device 10. In this case, three phases u, v, w of the motor 20 are connected to the three-phase output stage 13, which comprises a power converter and an inverter, respectively. The control of the current of the motor 20 is effected by outputting a pulse width modulated voltage of each of the three phases u, v, w.

The control device 10 comprises in addition to the output stage 13, a control unit 11, which may be in the form of one or more PI controller. Furthermore, a detection module 14 is provided, which is connected to the 3-phase output stage 13 and connected to the control unit 11 to form a control loop. By means of the detection module 14, the variables can be detected, which are controlled by the output variables of the output stage 13, and are fed back to the control unit 11 for the control. The illustrated structure thus comprises a conventional control loop of the prior art. Furthermore, the control device 10 comprises a modulator 12. The modulator 12 comprises in the illustrated device a transformer 121 and a pulse generator 122. The transformer 121 transforms the incoming signals and voltage nominal values, respectively, corresponding to the phases and supplies its output signals to the subsequent pulse generator 122. This generates pulse pattern for controlling the output stage 13, such that a pulse width modulated three-phase voltage with predetermined amount, phase angle and frequency is applied to the motor 20 to drive it.

FIG. 2 shows a modulator 12 which can be used, for example, in the device 10 shown in FIG. 1. Preferably, the modulator 12 is provided at an output of a control unit 11, and at an output of the modulator 12 is an output stage 13. The modulator comprises a transformer 121, pulse generator 122, latch or memory 123 and a decider 124. The person skilled in the art will understand that the modulator 12 shown in FIG. 2, in conjunction with the elements of FIG. 1, can form one or more of the modules of a device for current control. For example, such a calculation module for calculating the sets of switching times according to the invention can be formed by the control unit 11 and the transformer 121.

In the following, the present invention will be described by way of example with reference to the device 10 of FIG. 1 with the modulator 12 of FIG. 2. The detection module 14 is configured to detect an actual current value of the machine, such as a stator current. For this purpose, the corresponding output of the output stage 13 can be considered. This detection and sampling, respectively, takes place at discrete time intervals and relative to a PWM frequency of the control device 10.

The calculation module, which may be formed by the control unit 11 and the transformer 121 is configured to calculate a pulse pattern and, respectively, a set of switching times for signals for generating the pulse width modulated voltage of each phase u, v, w in an interval which is a current, running and present interval, respectively, or a subsequent interval. The calculation is carried out based on an actual current value detected by the detection module 14 in the currently running interval. This interval corresponds to the current sampling interval in which the actual current value was sampled by the detection module 14. The calculation of a set of switching times for a subsequent interval (and, respectively, a predictive first set) is based in addition to the actual current value further on a predictive actual current value and a current nominal value. This subsequent interval, for which the first set applies, can be the interval following the current or present sampling interval. The calculation of a set of switching times for the current interval and, respectively, the second set of switching times is based in addition to the actual current value on the current nominal value.

In this case, an FPGA can be used as the calculation module and a fast A/D converter as the detection module 14, such that the calculation of a set of switching times for a present interval is completed as early as possible within this interval. The same applies to the calculation of a predictive set of switching times for a subsequent interval such that it is advantageously available before the end of the present interval.

The calculation module may include a comparison module which is adapted for comparing an actual current value with a current nominal value. In this case, the comparison module can in particular compare the actual current value detected by the detection module 14 with a current nominal value valid for the present interval. Likewise, the comparison module can compare a predictive and, respectively, for a subsequent interval predicted actual current value with a current nominal value valid or predicted for the subsequent interval. The calculation module may access the result of the comparison module for calculating a set of switching times.

The calculated predictive set of switching times for signals for generating the pulse width modulated voltage of each phase u, v, w in a subsequent interval is stored in the latch or memory 123. The subsequent second set of switching times calculated for the current or present interval is only checked by the decider 124.

The decider 124 is adapted to determine 1) whether after the expiration of the computation time (and, respectively, the necessary time for the calculation of the second set of switching times) in the present interval one of the phases u, v, w has already switched, due to the predictive first set stored in the memory 123 and already effective, and 2) whether one of the switching times of the recalculated second set of switching times is in the past at the end of the computing time.

If it is determined that:
1) the second set of switching times calculated in the present interval and for the present interval is available before one of the phases has switched based on the predictive first set of switching times calculated in the previous cycle;
2) none of the switching times of the recalculated second set of switching times is in the past with respect to the expiration of the computational time,
is caused by the decider 124 that the predictive set of switching times stored in the memory 123 is overwritten by the second set of switching times. Otherwise, the second set of switching times is discarded.

The output module, which may be formed by the modulator 12 and in particular by the latch or memory 123, is arranged to provide a set of switching times for generating the pulse width modulated voltage of each phase u, v, w in one and in particular in each interval to the modulator 12, or in particular to the pulse generator 122. The output module may provide a set of switching times valid for the present and subsequent interval for generating the pulse width modulated voltage of each phase u, v, w in the corresponding interval to the pulse generator 122.

The control loop thus first calculates with a predictive set of switching times, which was calculated in a previous interval. In a current or present interval, a new set of switching times is calculated again based on the currently valid measured values, which can be used if the above two conditions apply. It will be understood by those skilled in the art that the modulator 12 may also include further components, such as for example a unit for implementing overmodulation, etc.

With reference to FIG. 3, in the following an embodiment of a method for current control of a pulse width modulated power converter will be described. This method can be executed by means of the controller 10 with modulator 12 described in FIGS. 1 and 2, and will be described in the following with reference to these FIGS. 1 and 2. The method extends over two intervals, with steps 31, 32 in the first interval, and steps 33-38 in the second (and, respectively, present) interval.

In step 31, a first actual current value is detected by means of the detection module 14 (preferably at the beginning of the first interval). This is, thus, valid for the first interval.

In step 32, by means of the calculation module, a calculation of a predictive first set of switching times is carried out for generating the pulse width modulated voltage of each phase u, v, w in the following second interval based on the first actual current value, a predictive actual current value (which is predicted for the second interval) and a current nominal value. The calculation preferably comprises a comparison of the predictive actual current value with the current nominal value.

The following steps 33-38 are now carried out in the second interval, which is referred to as the present interval. In step 33, a present actual current value is detected by means of the detection module 14, which is valid for the present interval.

In step 34, by means of the calculation module, a calculation of a second set of switching times is carried out for generating the pulse width modulated voltage of each phase u, v, w in the present interval, i.e. for that interval for which the first set of switching times was previously calculated, based on the detected present actual current value, and the running current nominal value. In this case, the calculation preferably comprises a comparison of the present actual current value detected by the detection module 14 with the current nominal value.

In decision 35, it is determined by means of the decider 124,
1) whether after the expiry of the computation time required for steps 33 and 34 in the present interval none of the phases u, v, w has already switched, due to the predictive first set which is stored in the memory 123 and is already effective;
2) whether none of the switching times of the recalculated second set of switching times is in the past with respect to the end of the computation time required for steps 33 and 34.

It is thus checked whether at the running time none of the switching times, neither from the first nor from the second set, is already in the past. If so, use of the second set of switching times by the pulse generator 122 is still possible in the present (and, respectively, second) interval.

If the decision 35 is negative, that is, if it has been determined that none of the switching times from the first or the second set of switching times is in the past, then in step 36 an overwriting is carried out of the previously stored first set of switching times for generating the pulse width modulated voltage of each phase u, v, w in the present interval by the second set of switching times that is just provided. The first set of switching times is no longer valid.

On the other hand, if decision 35 is positive, that is, if it has been determined that at least one of the switching times of the first or second set of switching times is in the past with respect to the end of the computation time of the second set, in subsequent step 37 the second set of switching times, calculated in step 34, is discarded. The pulse generator 122 further uses the predictive first set of switching times computed in the previous clock in step 32.

Subsequent to step 36 or 37, in step 38, a calculation of a predictive third set of switching times is carried out for generating the pulse width modulated voltage of each phase u, v, w in the subsequent future interval and the subsequent third interval, respectively. This calculation is carried out analogously to the calculation in step 32, however, both the present actual current value determined in step 33 as well as a predictive future actual current value (which is predicted for the future interval) and a running current nominal value are used. The calculation preferably comprises a comparison of the predictive future actual current value with the current nominal value.

Subsequently, an analogous execution of steps 33-38 takes place again in the subsequent future interval.

FIG. 4 shows, by way of example, the time profile of the pulse patterns for the control of the phases u, v, w of the output stage 13. The switching states of the three phases u, v, w are shown vertically offset from each other. At the times and, respectively, switching times $t_u$, $t_v$, $t_w$ the three phases switch in the $2^{nd}$ Interval $t_0 < t < t_1$.

At discrete times $t_{-1}$, $t_0$, $t_1$, $t_2$ and so on actual current values are sampled and detected, respectively, by means of the detection module 14. For example, an actual current value $I_0$ is detected at the time $t_0$. From an earlier, taking place in the $1^{st}$ interval $t_{-1} < t < t_0$, calculation and earlier prediction, respectively, a first set of times is available at this time $t_0$, based on which the individual phases u, v, w in the $2^{nd}$ interval $t_0 < t < t_1$ are to be switched.

According to the present invention, at time $t_0$ a calculation of a new set of switching times and, respectively, switching times for switching the phases in the running interval $t_0 < t < t_1$ is started, wherein the calculation is carried out under consideration of the effective actual current value $I_0$ measured for the current interval $t_0 < t < t_1$.

The calculation and inventive use of the sets of switching times is now explained in more detail with reference to FIGS. 5 and 6. In this case, the switching process according to the invention of the phase u is described. The switching operations of the phases v and w behave analogously.

As described above, a predictive switching time $t_u^p$ is already available at time $t_0$, which was calculated in the preceding interval for the present interval $t_0 < t < t_1$. It now starts a calculation of new control values for the pulse width modulated voltage for switching the phases in the interval $t_0 < t < t_1$, wherein the calculation is carried out taking into account the effective actual current value $I_0$ measured for the current interval $t_0 < t < t_1$. The calculation of this value $t_u^r$ is completed at time $t_r$.

For the situation shown in FIG. 5 it is valid that $t_r < t_u^p$ and $t_r < t_u^r$, respectively, both the predictive switching time $t_u^p$ and the recalculated switching time $t_u^r$ are behind the time $t_r$ in time. Therefore, the phase u (and also the other two phases v, w) has not yet switched at the time $t_r$. In addition, the recalculated switching time $t_u^r$ is in the future, it can be used to switch the phase u in the interval $t_0 < t < t_1$. Accordingly, this phase is now switched at the switching time $t_u^r$ and not at the predictive switching time $t_u^p$. Since the effective measured actual current value $I_0$ is used in order to calculate the time $t_u^r$, a highly dynamic control is possible. Subsequently, a predictive switching time is calculated for switching the phase u in the subsequent second interval $t_1 < t < t_2$. In general, a prediction of an actual current value for the time $t_1$ can be carried out for this purpose. For this purpose, it can also be taken into account which actual current value was detected at the sampling time $t_{-1}$. These predictive control values represent the predictive third set of switching times for the subsequent second interval $t_1 < t < t_2$.

At time $t_1$, an actual current value $I_1$ is detected again, and a new control set for switching the phase u in the interval $t_1 < t < t_2$ based on this actual current value $I_1$ is calculated again.

FIG. 6 shows an analogous situation to the situation illustrated in FIG. 5, but the predictive switching time $t_u^p$ of the phase u is now prior to the time $t_r$: $t_r > t_u^p$. Although $t_r < t_u^r$ applies here, as in FIG. 5, the switching time $t_r$ cannot be realized because the phase u has already switched. Consequently, according to the invention, the exact switching time $t_u^r$ detected in the period $t_0 < t < t^r$ is not used, but preferably discarded, as is the whole second set of switching times.

Furthermore, predictive control values are calculated again for the subsequent interval $t_1 < t < t_2$.

Although the switching behavior has been described in FIGS. 5 and 6 on the basis of the phase u, an analogous description also applies to the phases v and w. Switching times $t_v^P$, $t_w^P$ and $t_v^r$, $t_w^r$ are considered here accordingly. According to the invention, in the situation shown in FIG. 5 the switching time $t_u^r$ is not used if, by the time $t_r$, one of the phases v, w based on the corresponding predictive switching time $t_v^P$, $t_w^P$ has already switched.

The method described with reference to FIGS. 4-6 is carried out for each sampling interval $t_0 < t < t_1$, $t_1 < t < t_2$ and so on. An interval is limited by two sampling times. A PWM period or a PWM interval extends in the embodiment shown over two sampling intervals. The sampling frequency is preferably twice as high as the PWM frequency, since a PWM period extends, for example, from $t_{-1}$ to $t_1$. However, the method is not limited to this. Rather, the sampling frequency may also be identical to the PWM frequency, such that a set of switching times for generating the pulse width modulated voltage of each phase determines both the rising and falling edges of the pulse pattern in each interval.

The invention claimed is:

1. A method for current control of a pulse width modulated power converter for an electrical machine, in particular a pulse width modulated inverter for the electrical machine, wherein the power converter and the electrical machine comprise multiple phases (u, v, w), and wherein the current control is carried out by a control loop, wherein the control loop comprises means for calculation of switching times for generating a pulse width modulated voltage for each phase (u, v, w), the method comprising:
   a) detecting a first actual current value ($I_{-1}$) of the electrical machine in a first interval ($T_{-1}$);
   b) calculating a predictive first set of switching times ($t_u^P$, $t_v^P$, $t_w^P$) for signals for generating the pulse width modulated voltage of each phase (u, v, w) in a present interval ($T_0$) following the first interval based at least on the detected first actual current value ($I_{-1}$), a predictive actual current value (Ip) and a current nominal value ($I_{S0}$), wherein the predictive actual current value ($I_p$) is determined based at least on the detected first actual current value ($I_{-1}$);
   c) providing the first set of switching times ($t_u^P$, $t_v^P$, $t_w^P$) in the present interval ($T_0$);
   d) detecting a present actual current value ($I_0$) of the electrical machine in the present interval ($T_0$);
   e) calculating a second set of switching times ($t_u^r$, $t_v^r$, $t_w^r$) for signals for generating the pulse width modulated voltage of each phase (u, v, w) in the present interval ($T_0$) based at least on the detected present actual current value ($I_0$) and the current nominal value ($I_{S0}$);
   f) determining whether at a calculation time ($t_r$) at which the calculation of the second set of switching times ($t_u^r$, $t_v^r$, $t_w^r$) is completed, none of the switching switching times ($t_u^r$, $t_v^r$, $t_w^r$, $t_u^P$, $t_v^P$, $t_w^P$) from the first and second set of switching times occurred prior to the calculation time (tr) ($t_u^P > t_r$, $t_v^P > t_r$, $t_w^P > t_r$, $t_u^r > t_r$, $t_v^r > t_r$, $t_w^r > t_r$); wherein
   g) if it is determined that, at the calculation time ($t_r$) in the present interval ($T_0$), none of the switching times ($t_u^r$, $t_v^r$, $t_w^r$, $t_u^P$, $t_v^P$, $t_w^P$) from the first and second set of switching times occurred prior to the calculation time ($t_r$) the second set of switching times ($t_u^r$, $t_v^r$, $t_w^r$) is used for signals for generating the pulse width modulated voltage of each phase (u, v, w) in the present interval ($T_0$); or
   h) if it is determined that, at the calculation time ($t_r$) in the present interval ($T_0$), at least one of the switching times ($t_u^r$, $t_v^r$, $t_w^r$, $t_u^P$, $t_v^P$, $t_w^P$) from the first or second set of switching times occurred prior to the calculation time ($t_r$), the first set of switching times ($t_u^P$, $t_v^P$, $t_w^P$) is used for signals for generating the pulse width modulated voltage of each phase (u, v, w) in the present interval ($T_0$).

2. The method according to claim 1, wherein the first and the present interval are each a period or a half period of the pulse width modulated voltage.

3. The method according to claim 1 wherein the detection of the actual current value takes place in the context of a discrete-time control at discrete sampling times, wherein the detection of the actual current value preferably takes place at the beginning of each interval.

4. The method according to claim 1, wherein the determination, whether at the calculation time ($t_r$) in the present interval ($T_0$) none of the switching times ($t_u^r$, $t_v^r$, $t_w^r$, $t_u^P$, $t_v^P$, $t_w^P$) from the first and second set of switching times occurred prior to the calculation time (tr), is carried out after and preferably immediately after the calculation of the second set of switching times.

5. The method according to claim 1, wherein when it has been determined that at the calculation time ($t_r$) in the present interval ($T_0$) none of the switching times ($t_u^r$, $t_v^r$, $t_w^r$, $t_u^P$, $t_v^P$, $t_w^P$) from the first and second set of switching times occurred prior to the calculation time ($t_r$) the provided first set of switching times ($t_u^P$, $t_v^P$, $t_w^P$) is overwritten by the second set of switching times ($t_u^r$, $t_v^r$, $t_w^r$) in a memory.

6. The method according to claim 1, wherein when it has been determined that at the calculation time ($t_r$) in the present interval ($T_0$) at least one of the switching times ($t_u^r$, $t_v^r$, $t_w^r$, $t_u^P$, $t_v^P$, $t_w^P$) from the first or second set of switching times occurred prior to the calculation time ($t_r$) the second set of switching times ($t_u^r$, $t_v^r$, $t_w^r$) is discarded.

7. The method according to claim 1, wherein the predictive actual current value ($I_p$) is generated by adding the detected first actual current value ($I_{-1}$) with an actual current value change ($\Delta I_{-1}$) determined by current prediction.

8. The method according to claim 1, wherein the calculation of the predictive first set of switching times ($t_u^P$, $t_v^P$, $t_w^P$) is further based on an older actual current value ($I_{-2}$) of the electrical machine, wherein the older actual current value ($I_{-2}$) was detected in a previous interval ($T_{-2}$).

9. The method according to claim 1, further comprising calculating, during the present interval ($T_0$) or a later interval, a predictive third set of switching times ($t_u^{P'}$, $t_v^{P'}$, $t_w^{P'}$) for signals for generating the pulse width modulated voltage of each phase (u, v, w) in a future interval ($T_{+1}$) or a further future interval following the present interval based at least on the detected present actual current value, a predictive future actual current value and a current nominal value, and to calculate the predictive future actual current value at least on the detected present actual current value.

10. A device for current control of a pulse width modulated power converter for an electrical machine, in particular a pulse width modulated inverter for the electrical machine, wherein the power converter and the electrical machine comprise multiple phases (u, v, w), comprising:
   a) a modulator for pulse width modulation of a voltage of each phase (u, v, w);
   b) a detection module adapted to detect an actual current value of the electrical machine;
   c) a calculation module adapted to calculate, preferably during a first interval ($T_{-1}$) or a later interval, a predictive first set of switching times ($t_u^P$, $t_v^P$, $t_w^P$) for signals for generating the pulse width modulated voltage of each phase (u, v, w) in a present interval ($T_0$) following the first interval ($T_{-1}$) based at least on a first actual current value ($I_{-1}$) detected in the first interval ($T_{-1}$), a predictive actual current value ($I_p$) and a current nominal value ($I_{S0}$), wherein the calculation module is adapted for determining the predictive actual current value ($I_p$) based at least on the first actual current value ($I_{-1}$) and for calculating, during the present interval ($T_0$) or a later interval, a second set of switching times ($t_u^r$, $t_v^r$, $t_w^r$) for signals for generating the pulse width modulated voltage of each phase (u, v, w) in the present interval ($T_0$) based at least on a present actual current value ($I_0$) detected in the present interval ($T_0$) and a current nominal value ($I_{S0}$), wherein a decider of the modulator is adapted to determine whether up to a calculation time ($t_r$), at which the calculation of the second set of switching times ($t_u^r$, $t_v^r$, $t_w^r$) in the present interval ($T_0$) is complete, none of switching times ($t_u^r$, $t_v^r$, $t_w^r$, $t_u^p$, $t_v^p$, $t_w^p$) from the first and second set of switching times occurred prior to the calculation time ($t_r$) ($t_u^p > t_r$, $t_v^p > t_r$, $t_w^p > t_r$, $t_u^r > t_r$, $t_v^r > t_r$, $t_w^r > t_r$);

d) an output module adapted to provide the first set of switching times ($t_u^p$, $t_v^p$, $t_w^p$) for signals for generating the pulse width modulated voltage of each phase (u, v, w) in the present interval ($T_0$) to the modulator, if it is determined by the decider that, at the calculation time ($t_r$) in the present interval ($T_0$), at least one of the switching times ($t_u^r$, $t_v^r$, $t_w^r$, $t_u^p$, $t_v^p$, $t_w^p$) from the first or second set of switching times occurred prior to the calculation time ($t_r$), and to provide the second set of switching times ($t_u^r$, $t_v^r$, $t_w^r$) for signals for generating the pulse width modulated voltage of each phase (u, v, w) in the present interval ($T_0$) to the modulator if it is determined by the decider that, at the calculation time ($t_r$) in the present interval ($T_0$), none of the switching times ($t_u^r$, $t_v^r$, $t_w^r$, $t_u^p$, $t_v^p$, $t_w^p$) from the first and second set of switching times occurred prior to the calculation time ($t_r$).

11. The device according to claim 10, wherein the calculation module is further configured to calculate, during the present interval ($T_0$) or a later interval, a predictive third set of switching times ($t_u^{p'}$, $t_v^{p'}$, $t_w^{p'}$) for signals for generating the pulse width modulated voltage of each phase (u, v, w) in a future interval ($T_{+1}$) or a further future interval following the present interval based at least on the detected present actual current value, a predictive future actual current value and a current nominal value, and to calculate the predictive future actual current value at least on the detected present actual current value.

12. The device according to claim 10, wherein the calculation module comprises a digital logic, in particular within an FPGA.

13. The device according to claim 10, further comprising a prediction module adapted to determine the predictive actual current value (Ip, Ip+i).

14. The device according to claim 10, further comprising a memory element for storing the calculated first set of switching times ($t_u^p$, $t_v^p$, $t_w^p$), and wherein the decider is adapted to cause an override of the stored first set of switching times ($t_u^p$, $t_v^p$, $t_w^p$) by the second set of switching times, if it has been determined that, at the calculation time ($t_r$) in the present interval ($T_0$), none of the switching times ($t_u^r$, $t_v^r$, $t_w^r$, $t_u^p$, $t_v^p$, $t_w^p$) from the first and second set of switching times occurred prior to the calculation time ($t_r$).

15. The device according to claim 10, wherein the device is adapted for carrying out a method according to claim 1.

16. The device according to claim 10, further comprising:
a controller, wherein the modulator is connected to an output of the controller;
a 3-phase output stage connected to an output of the modulator, in particular a 3-phase inverter, wherein the detection module is connected to the 3-phase output stage and wherein the detection module is connected to the controller to form a control loop; wherein
the modulator comprises a pulse generator for generating pulse patterns for a pulse width modulation of a voltage of each phase (u, v, w), a transformer, a memory and the decider, wherein
the detection module is adapted to detect an actual current value ($I_0$, $I_{-1}$) of the electrical machine in the first and in the present interval ($T_0$, $T_{-1}$), wherein
the controller and the transformer are adapted to calculate the predictive first set of switching times ($t_u^p$, $t_v^p$, $t_w^p$); wherein
the memory is adapted to provide the first set of switching times ($t_u^p$, $t_v^p$, $t_w^p$) in the present interval ($T_0$); wherein
the controller and the transformer are adapted to calculate the second set of switching times ($t_u^r$, $t_v^r$, $t_w^r$); wherein
the decider is adapted to compare the calculation time ($t_r$) with each switching time of the second set of switching times ($t_u^r$, $t_v^r$, $t_w^r$); wherein
the decider is further adapted, if, in accordance with the comparison, the calculation time ($t_r$) is before each of the switching times ($t_u^r$, $t_v^r$, $t_w^r$, $t_u^p$, $t_v^p$, $t_w^p$) in the present interval ($T_0$), to output a control signal, in order to cause that the second set of switching times ($t_u^r$, $t_v^r$, $t_w^r$) is applied to the pulse generator for generating the pulse pattern in the present interval ($T_0$); and wherein
the decider is further adapted, if, in accordance with the comparison, the calculation time ($t_r$) is not before each of the switching times ($t_u^r$, $t_v^r$, $t_w^r$, $t_u^p$, $t_v^p$, $t_w^p$) in the present interval ($T_0$), to output a control signal, in order to cause that the first set of switching times ($t_u^r$, $t_v^r$, $t_w^r$) is applied to the pulse generator for generating the pulse patterns in the present interval ($T_0$).

* * * * *